United States Patent Office 3,356,771
Patented Dec. 5, 1967

3,356,771
O,O - DIALKYLTHIONOPHOSPHORYL OR O,O-DIALKYLDITHIOPHOSPHORYL FATTY ACID CHLORIDES
Guenter Scheuerer and Heiner Dickhaeuser, Ludwigshafen (Rhine), Germany, assignors to Badische Anilin- & Soda-Fabrik Aktiengesellschaft, Ludwigshafen (Rhine), Germany
No Drawing. Filed Dec. 26, 1963, Ser. No. 333,723
Claims priority, application Germany, Jan. 5, 1963, B 70,230
9 Claims. (Cl. 260—941)

From Houben-Weyl "Methoden der organischen Chemie," 4th edition, volume 8, page 464, it is known that carboxylic acids or their salts can be converted with phosphorous pentachloride ($PCl_5$), phosphorous trichloride ($PCl_3$), phosphorus oxychloride ($POCl_3$) or thionyl chloride ($SOCl_2$) into carboxylic acid chlorides.

It is furthermore known from U.S. patent specification No. 2,630,451 that O,O-dialkyldithiophosphorylsuccinic acid half-amides having the formula:

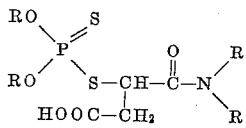

can be reacted with thionyl chloride to form the corresponding acid chlorides. The acid chlorides are not isolated in substance, however, but are immediately esterified with alcohols in the production solution to give dark-colored products; there is no statement as to the yields obtained.

We have now found that O,O-dialkylthionophosphoryl and O,O-dialkyldithiophosphoryl fatty acids having the general formula:

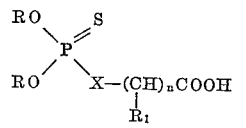

in which R denotes a lower alkyl radical which may be substituted, $R_1$ denotes hydrogen or a lower alkyl radical, X denotes oxygen or sulfur and $n$ denotes one of the whole numbers 1 to 5 can be smoothly converted into the corresponding O,O-dialkylthionophosphoryl or O,O-dialkyldithiophosphoryl fatty acid chlorides, with compounds having the general formula:

Cl—(CO)$_m$—Cl in which $m$ is 1 or 2 (i.e. with phosgene or oxalyl chloride) and, when the reaction is carried out with phosgene, in the presence of N,N-dialkyl substituted carboxylic amides of lower aliphatic carboxylic acids or of N-alkyl substituted lactams. The acid chlorides are obtained in good purity and high yields.

Attempts to prepare the acid chlorides by means of thionyl chloride are unsuccessful. The action of other known chlorination agents, as for example phosphorus pentachloride, phosphorus trichloride or phosphorus oxychloride, gives only small amounts of acid chloride together with byproducts which can only be separated with difficulty.

Examples of O,O-dialkylthionophosphoryl or O,O-dialkyldithiophosphoryl fatty acids which may be used are:

O,O-dimethyldithiophosphorylacetic acid,
α-(O,O-diethyldithiophosphoryl)-propionic acid,
β-(O,O-diethyldithiophosphoryl)-propionic acid,
β-(O,O-dimethyldithiophosphoryl)-butyric acid,
α-(O,O-diethyldithiophosphoryl)-isobutyric acid,
O,O-diethylthionophosphorylacetic acid and
β-(O,O-diethylthionophosphoryl)-propionic acid.

O,O-dialkyldithiophosphoryl fatty acids may be prepared in known manner from a salt of a O,O-dialkyldithiophosphoric acid and a halofatty acid or by adding on the free O,O-dialkyldithiophosphoric acids to unsaturated fatty acids. O,O-dialkylthionophosphoryl fatty acids may be obtained from O,O-dialkylthionophosphoryl chlorides and hydroxyfatty acids, if necessary adding acid-binding agents.

The reaction of the said acids with phosgene or oxalyl chloride may be carried out with or without diluents. Suitable solvents are for example aromatic hydrocarbons, for example benzene, toluene or halogenated hydrocarbons, for example carbon tetrachloride, or chlorobenzene.

The following are given as examples of effective N,N-dialkyl substituted carboxylic amides:

N,N-dimethylformamide, N,N-diethylformamide, N,N-dimethylacetamide, N,N-dibutylpropionamide and N-formylpyrrolidine.

Dialkyl substituted formamides are preferred.

Examples of N-alkylated lactams are N-methylpyrrolidone and N-ethylcaprolactam.

The N,N-dialkyl substituted carboxylic amides or the N-alkyl substituted lactams are preferably added in amounts of 0.05 to 0.2 mole per mole of phosgene or oxalyl chloride.

The phosgene may be added to the reaction mixture either in the gaseous phase or dissolved in a diluent, for example benzene, toluene, carbon tetrachloride. It is advantageous to use an excess of phosgene, for example 1.5 to 5 moles of phosgene per mole of substituted carboxylic acid.

The exothermic reaction may be carried out between 0° and 100° C., preferably between 20° and 60° C.

After the reaction is over, the carbonamide separates as a liquid layer in the form of its reaction product with phosgene. The supernatant crude acid chloride or its solution is decanted and any solvent present removed under subatmospheric pressure. The crude acid chloride which remains is in general an oil which cannot be distilled.

Reaction of the O,O-dialkylthionophosphoryl or O,O-dialkyldithiophosphoryl fatty acids with oxalyl chloride may be carried out with or without diluents, such as benzene, toluene or carbon tetrachloride. Stoichiometric amounts of oxalyl chloride are sufficient but it is advantageous to use a slight excess. Reaction takes place even at room temperature but proceeds more rapidly at elevated temperature. It is advantageous to use temperatures between 40° and 80° C. When the reaction is over, dissolved hydrogen chloride, excess oxalyl chloride and the solvent are separated under subatmospheric pressure.

In the case of oxalyl chloride, it is not necessary (as with phosgene) to use a carbonamide or lactam. The addition of such a catalyst is however not deleterious. When a catalyst is present, it is advantageous to work in the temperature range of 20° to 60° C.

The reaction may thus be carried out in the presence or absence of one of the said catalysts.

The O,O-dialkylthionophosphoryl fatty acid chlorides and O,O-dialkyldithiophosphoryl fatty acid chlorides obtainable by the process according to this invention are important intermediates for the production of plant protection agents.

Thus O,O-dimethyldithiophosphorylacetic acid N-methylamide, which is a well-known insecticidal substance, is formed from O,O-dimethyldithiophosphorylacetyl chloride by a conventional method.

It is surprising that phosphoryl fatty acid chlorides should be obtained in good yields by the process according to this invention because it is known that the acid chlorides cannot be prepared or can only be prepared in a very impure state (see J. Org. Chem. 26 (1961), 2281).

The invention is further illustrated by the following examples. The parts and percentages given are parts by weight and percentages by weight.

*Example 1*

38.1 parts of oxalyl chloride is added at room temperature within fifteen minutes to 43.2 parts of O,O-dimethyldithiophosphorylacetic acid dissolved in 100 parts of toluene. The whole is heated to 50° to 60° C., a vigorous disengagement of gas taking place. After the whole has been stirred for another three hours at 60° C., dissolved gases, excess oxalyl chloride and toluene are removed under subatmospheric pressure at a bath temperature of 50° C. 45.1 parts of an orange brown oil remain: $n_D^{23}=1.537$. Calculated: $C_4H_8ClO_3PS_2$ (mol. 234.7) 15.11% Cl; found: 14.5% Cl.

The compound has the structural formula:

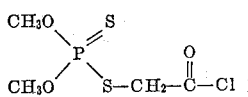

*Example 2*

50 parts of phosgene is dripped at 25° to 30° C. into a solution of 43.2 parts of O,O-dimethyldithiophosphorylacetic acid and 4.3 parts of dimethylformamide in 145 parts of toluene while cooling slightly. The whole is stirred for another hour at 25° to 30° C. The dimethylformamide-phosgene complex which separates as a heavy oil is removed, the dissolved phosgene blown out from the toluene solution with nitrogen at room temperature, and the toluene removed under subatmospheric pressure at a bath temperature of 50° C. The residue is 45.3 parts of O,O-dimethyldithiophosphorylacetyl chloride in the form of a brown oil. Found: 14.4% Cl.

*Example 3*

38.1 parts of oxalyl chloride is dripped at 25° to 30° C. during fifteen minutes into a solution of 43.2 parts of O,O-dimethyldithiophosphorylacetic acid and 2.2 parts of dimethylformamide in 100 parts of toluene while cooling slightly. The whole is stirred for another two hours at 25° to 30° C., separated from the lower layer and the toluene solution concentrated under subatmospheric pressure at a bath temperature of 50° C. 44.5 parts of O,O-dimethyldithiophosphorylacetyl chloride remains as a brown oil. Chlorine content found: 14.2%.

An attempt to carry out the reaction with phosphorus trichloride did not give the desired end product. The attempt was carried out as follows:

27.6 parts of phosphorus trichloride is added at room temperature to 43.2 parts of O,O-dimethyldithiophosphorylacetic acid dissolved in 100 parts of toluene. The whole is heated for three hours at 60° C., cooled to room temperature and decanted from the syrupy lower layer. The upper layer containing toluene is worked up as described in Example 1. 39.5 parts of a yellow oil is obtained; $n_D^{23}=1.556$; chlorine content 7.6%. The end product thus contains far less chlorine than the intended product.

*Example 4*

Production of a compound having the formula:

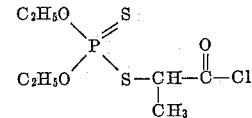

51.6 parts of α-(O,O-diethyldithiophosphoryl)-propionic acid is dissolved in 100 parts of toluene and the whole reacted with 38.1 parts of oxalyl chloride as described in Example 1. The yield is 54.2 parts of an orange oil; $n_D^{21}=1.512$; calculated: $C_7H_{14}ClO_3PS_2$ (mol. 276.7); 12.81% Cl, found: 12.7% Cl.

*Example 5*

Production of a compound having the formula:

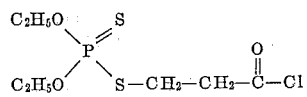

By the procedure described in Example 1, 55.0 parts of the corresponding acid chloride is prepared from 51.6 parts of β-(O,O-diethyldithiophosphoryl)-propionic acid in 100 parts of toluene with 38.1 parts of oxalyl chloride. The product is a brown oil; $n_D^{21}=1.517$; calculated: $C_7H_{14}ClO_3PS_2$ (mol. 276.7): 12.81% Cl, found: 12.6% Cl.

We claim:
1. A chemical compound having the formula:

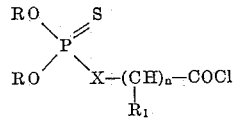

in which R denotes a lower alkyl radical, $R_1$ denotes a member selected from the group consisting of hydrogen and lower alkyl, X denotes a member selected from the group consisting of oxygen and sulfur and $n$ denotes one of the whole numbers 1 to 5.
2. O,O-dimethyldithiophosphorylacetyl chloride.
3. O,O-diethyldithiophosphorylacetyl chloride.
4. α-(O,O-diethyldithiophosphoryl)-propionyl chloride.
5. β-(O,O-diethyldithiophosphoryl)-propionyl chloride.
6. β-(O,O-dimethylthiophosphoryl)-butyryl chloride.
7. α-(O,O-diethyldithiophosphoryl)-isobutyryl chloride.
8. β-(O,O-diethylthionophosphoryl)-propionyl chloride.
9. O,O-diethylthionophosphorylacetyl chloride.

References Cited

UNITED STATES PATENTS 2,645,657  7/1953  Rudel et al. _____ 260—941
3,184,506  5/1965  Parker et al. _____ 260—544

FOREIGN PATENTS 851,684  10/1960  Great Britain.

CHARLES B. PARKER, *Primary Examiner.*

A. H. SUTTO, *Assistant Examiner.*

UNITED STATES PATENT OFFICE
CERTIFICATE OF CORRECTION

Patent No. 3,356,771                           December 5, 1967

Guenter Scheuerer et al.

It is certified that error appears in the above identified patent and that said Letters Patent are hereby corrected as shown below:

Column 4, line 48, "dimethylthiophosphoryl" should read -- dimethyldithiophosphoryl --.

Signed and sealed this 16th day of December 1969.

(SEAL)
Attest:

Edward M. Fletcher, Jr.
Attesting Officer

WILLIAM E. SCHUYLER, JR.
Commissioner of Patents